United States Patent
Patil et al.

(10) Patent No.: US 9,785,643 B1
(45) Date of Patent: Oct. 10, 2017

(54) SYSTEMS AND METHODS FOR RECLAIMING STORAGE SPACE IN DEDUPLICATING DATA SYSTEMS

(71) Applicant: Symantec Corporation, Mountain View, CA (US)

(72) Inventors: Deepak Patil, Maharashtra (IN); Vishal Bajpai, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 867 days.

(21) Appl. No.: 14/019,971

(22) Filed: Sep. 6, 2013

(51) Int. Cl.
G06F 17/30 (2006.01)

(52) U.S. Cl.
CPC .............. G06F 17/30156 (2013.01)

(58) Field of Classification Search
CPC ............ G06F 17/30085; G06F 11/1446
See application file for complete search history.

(56) References Cited

U.S. PATENT DOCUMENTS

| | | | | |
|---|---|---|---|---|
| 8,041,907 B1* | 10/2011 | Wu | ............. | G06F 11/1453 707/640 |
| 8,495,022 B1 | 7/2013 | Zhu et al. | | |
| 8,825,720 B1* | 9/2014 | Xie | ............. | G06F 17/30156 707/694 |
| 9,063,946 B1* | 6/2015 | Barber | ............. | G06F 17/30117 |
| 2011/0161297 A1* | 6/2011 | Parab | ............. | G06F 11/1453 707/646 |
| 2011/0191302 A1* | 8/2011 | Nasu | ............. | G06F 17/30171 707/664 |
| 2012/0143835 A1* | 6/2012 | Aronovich | ............. | G06F 11/1453 707/696 |
| 2015/0074058 A1* | 3/2015 | Zhao | ............. | G06F 11/1446 707/646 |

OTHER PUBLICATIONS

Neel Bhatt et al.; Systems and Methods for Managing References in Deduplicating Data Systems; U.S. Appl. No. 13/915,072, filed Jun. 11, 2013.
David Teater et al.; Systems and Methods for Creating Optimized Synthetic Backup Images; U.S. Appl. No. 13/915,682, filed Jun. 12, 2013.

* cited by examiner

*Primary Examiner* — Kris Mackes
*Assistant Examiner* — Soheila (Gina) Davanlou
(74) *Attorney, Agent, or Firm* — FisherBroyles LLP

(57) ABSTRACT

A computer-implemented method for reclaiming storage space in deduplicating data systems may include (1) storing at least one non-synthesized backup image within a deduplicating data system by storing at least one data segment of the non-synthesized backup image within a container of deduplicated data segments that is used by the deduplicating data system, (2) storing at least one synthesized backup image within the deduplicating data system by referencing at least one previously stored data segment within the container that is also referenced by a previous backup image within the deduplicating data system, (3) determining that no non-synthesized backup images still reference the container, and (4) removing the data segment of the non-synthesized backup image from the container of deduplicated data segments in response to determining that no non-synthesized backup images still reference the container. Various other methods, systems, and computer-readable media are also disclosed.

15 Claims, 6 Drawing Sheets

SYSTEMS AND METHODS FOR RECLAIMING STORAGE SPACE IN DEDUPLICATING DATA SYSTEMS

BACKGROUND

Deduplicating data systems are often able to reduce the amount of storage space needed to store files by recognizing redundant data patterns. For example, a conventional deduplicating data system may reduce the amount of storage space needed to store similar files by dividing the files into data segments and storing only unique data segments. In this example, each deduplicated file stored within the deduplicating data system may be represented by a list of references to those data segments that make up the file.

Some deduplicating data systems may store unique data segments in one of several containers. In some examples, such deduplicating data systems may maintain a reference count for how many data objects reference each container (e.g., in order to reclaim storage space by deleting the container when the container is no longer referenced). In these examples, the deduplicating data systems may set an expiry age for containers, after which no new data objects may reference the containers (e.g., to ensure that each container will eventually become unreferenced and may be deleted).

To protect against data loss, an organization may use a backup system to back up important data. In order to reduce the resources required to perform each backup, the backup system may perform a full backup of the data, followed by incremental backups capturing changes to the data since the last backup.

Restoring data for a system using incremental backups may require applying changes recorded in one or more incremental backups to data in a full backup. In order to improve performance and/or reduce resource consumption, some backup systems may periodically consolidate the most recent full backup and all subsequent incremental backups into a synthetic backup (e.g., an up-to-date full backup constructed from existing backup data).

When stored by deduplicating data systems, synthetic backups may simply reference existing data segments. Unfortunately, synthetic backups may interfere with some space saving techniques used by traditional deduplicating data systems. Because synthetic backups may reference a small number of data segments almost indefinitely, traditional deduplicating data systems may maintain large segment containers to store just a few data segments over a long period of time.

Accordingly, the instant disclosure identifies and addresses a need for additional and improved systems and methods for reclaiming storage space in deduplicating data systems.

SUMMARY

As will be described in greater detail below, the instant disclosure generally relates to systems and methods for reclaiming storage space in deduplicating data systems by aging out containers within deduplicating data systems and removing data segments corresponding to past non-synthesized backups from aged-out containers when no non-synthesized backup images still reference the container. In some examples, these systems and methods may maintain container maps to identify and locate data segments corresponding to synthesized backups.

In one example, a computer-implemented method for reclaiming storage space in deduplicating data systems may include (1) storing at least one non-synthesized backup image within a deduplicating data system by storing at least one data segment of the non-synthesized backup image within a container of deduplicated data segments that is used by the deduplicating data system, (2) storing at least one synthesized backup image within the deduplicating data system by referencing at least one previously stored data segment within the container that is also referenced by a previous backup image within the deduplicating data system, (3) determining that no non-synthesized backup images still reference the container, and (4) removing the data segment of the non-synthesized backup image from the container of deduplicated data segments in response to determining that no non-synthesized backup images still reference the container and determining that no synthesized backup image references the data segment.

In some examples, storing the non-synthesized backup within the deduplicating data system may include storing the non-synthesized backup within the deduplicating data system before the container no longer accepts new deduplicated data segments. In some examples, storing the synthesized backup image within the deduplicating data system may include storing the synthesized backup image within the deduplicating data system after the container no longer accepts new deduplicated data segments. In some examples, storing the synthesized backup image within the deduplicating data system may include storing an indication of an initial location within the container of the previously stored data segment in a container map.

In some examples, removing the data segment of the non-synthesized backup from the container may include (1) compacting the container by moving the previously stored data segment to a new location within the container, and (2) storing an indication of the new location within the container of the previously stored data segment in the container map.

In one embodiment, (1) storing the non-synthesized backup image may include incrementing a non-synthesized reference count for the container, (2) storing the synthesized backup image may include incrementing a synthesized reference count for the container, and (3) determining that no non-synthesized backup images still reference the container may include determining that the non-synthesized reference count for the container is at zero.

In one embodiment, the container may expire at a predetermined time, before which the container accepts new deduplicated data segments and after which the container no longer accepts new deduplicated data segments.

In some examples, the computer-implemented method may further include restoring the synthesized backup image by retrieving a current location within the container of the previously stored data segment from a container map that corresponds to the container.

In one embodiment, a system for implementing the above-described method may include (1) a storage module that stores at least one non-synthesized backup image within a deduplicating data system by storing at least one data segment of the non-synthesized backup image within a container of deduplicated data segments that is used by the deduplicated data system, (2) a synthesizing module that stores at least one synthesized backup image within the deduplicating data system by referencing at least one previously stored data segment within the container that is also referenced by a previous backup image within the deduplicating data system, (3) a determination module that determines that no non-synthesized backup images still reference the container, (4) a removing module that removes the data segment of the non-synthesized backup image from the container of deduplicated data segments in response to determining that no non-synthesized backup images still reference the container and determining that no synthesized backup image references the data segment, and (5) at least one processor configured to execute the storing module, the synthesizing module, the determination module, and the removing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) store at least one non-synthesized backup image within a deduplicating data system by storing at least one data segment of the non-synthesized backup image within a container of deduplicated data segments that is used by the deduplicating data system, (2) store at least one synthesized backup image within the deduplicating data system by referencing at least one previously stored data segment within the container that is also referenced by a previous backup image within the deduplicating data system, (3) determine that no non-synthesized backup images still reference the container, and (4) remove the data segment of the non-synthesized backup image from the container of deduplicated data segments in response to determining that no non-synthesized backup images still reference the container and determining that no synthesized backup image references the data segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
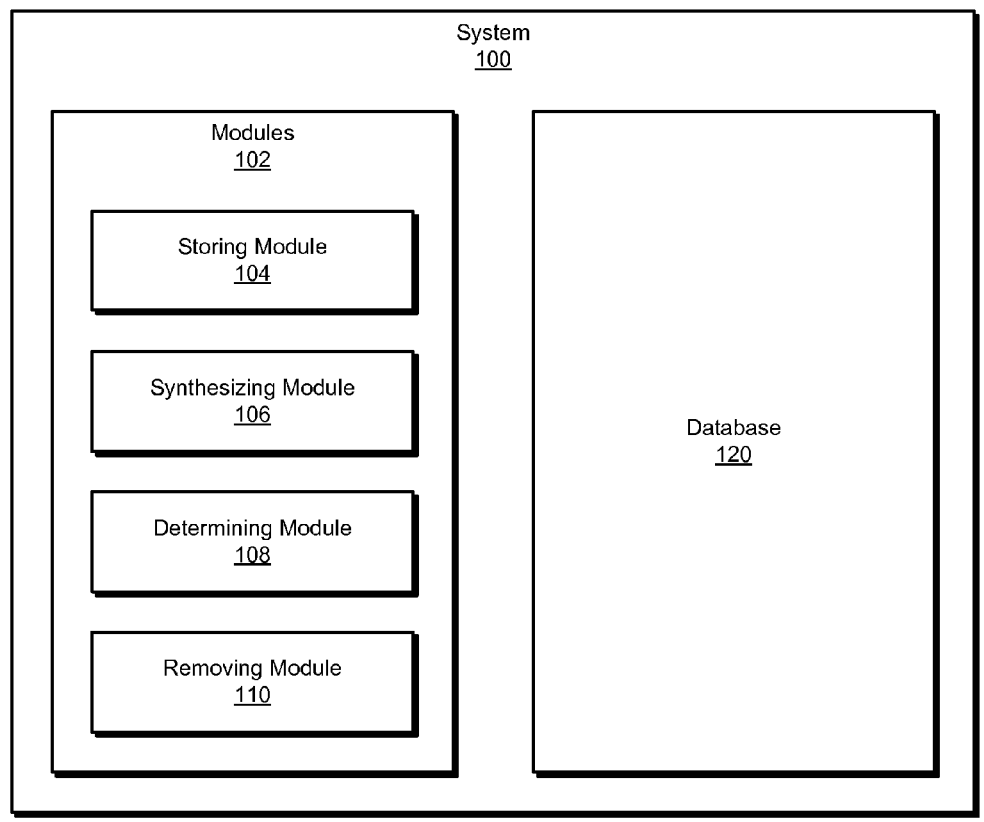
FIG. 1 is a block diagram of an exemplary system for reclaiming storage space in deduplicating data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for reclaiming storage space in deduplicating data systems. As will be explained in greater detail below, by aging out containers within deduplicating data systems and removing data segments corresponding to past non-synthesized backups from aged-out containers when no non-synthesized backup images still reference the container, the systems and methods described herein may preserve data segments in long use by synthesized backups while recapturing space within expired containers from non-synthesized backups. In some examples, these systems and methods may maintain container maps to identify and locate data segments corresponding to synthesized backups.

Figure 2:
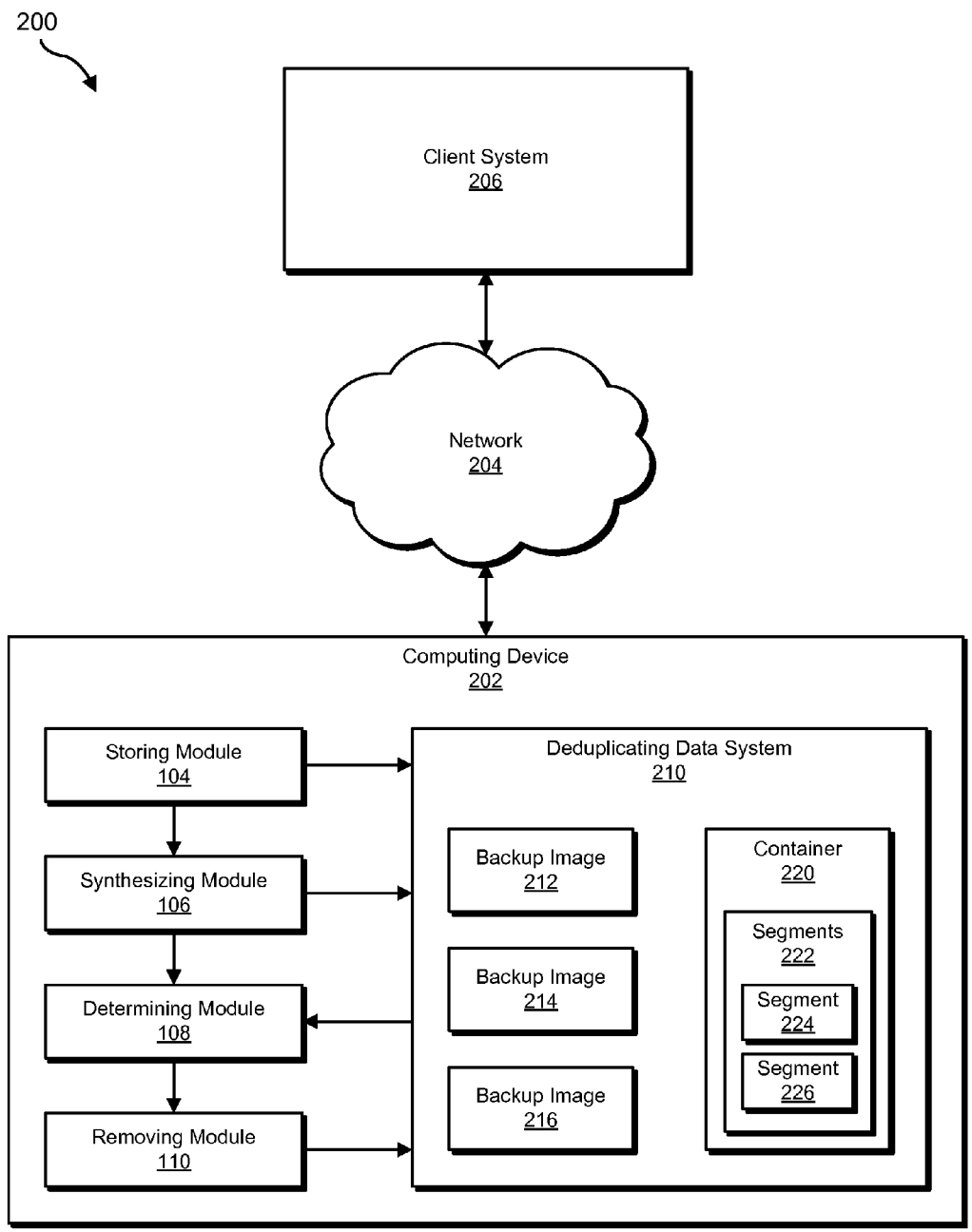
FIG. 2 is a block diagram of an exemplary system for reclaiming storage space in deduplicating data systems.

The following will provide, with reference to FIGS. 1-2, detailed descriptions of exemplary systems for reclaiming storage space in deduplicating data systems. Detailed descriptions of corresponding computer-implemented methods will also be provided in connection with FIG. 3. Detailed descriptions of a deduplicating data system will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for reclaiming storage space in deduplicating data systems. As illustrated in this figure, exemplary system 100 may include one or more modules 102 for performing one or more tasks. For example, and as will be explained in greater detail below, exemplary system 100 may also include a storing module 104 that may store at least one non-synthesized backup image within a deduplicating data system by storing at least one data segment of the non-synthesized backup image within a container of deduplicated data segments that may be used by the deduplicating data system. Exemplary system 100 may additionally include a synthesizing module 106 that may store at least one synthesized backup image within the deduplicating data system by referencing at least one previously stored data segment within the container that may be also referenced by a previous backup image within the deduplicating data system. Exemplary system 100 may also include a determination module 108 that may determine that no non-synthesized backup images still reference the container. Exemplary system 100 may additionally include a removing module 110 that may remove the data segment of the non-synthesized backup image from the container of deduplicated data segments in response to determining that no non-synthesized backup images still reference the container and determining that no synthesized backup image references the data segment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2

Figure 5:
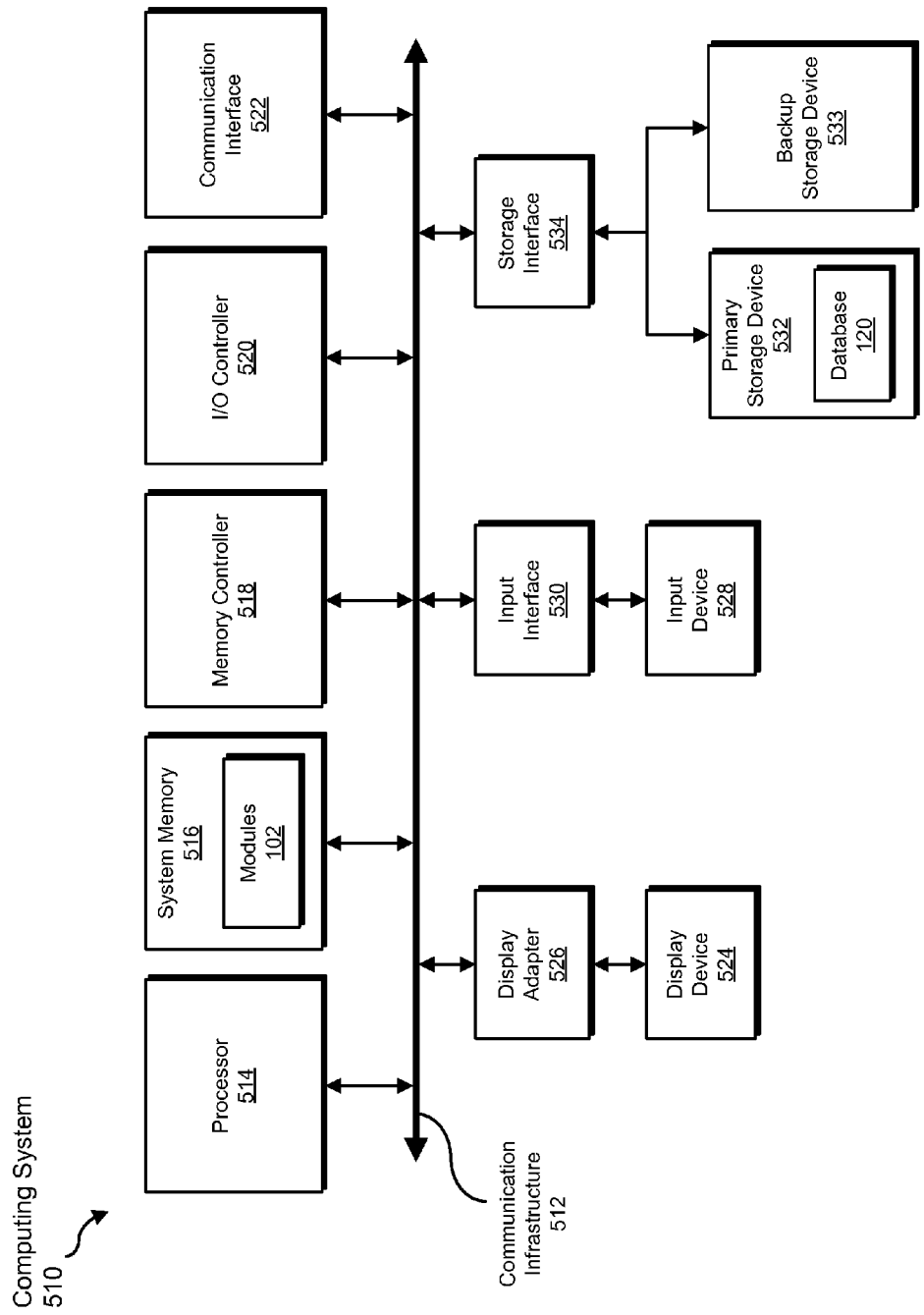
FIG. 5 is a block diagram of an exemplary computing system capable of implementing one or more of the embodiments described and/or illustrated herein.
Figure 6:
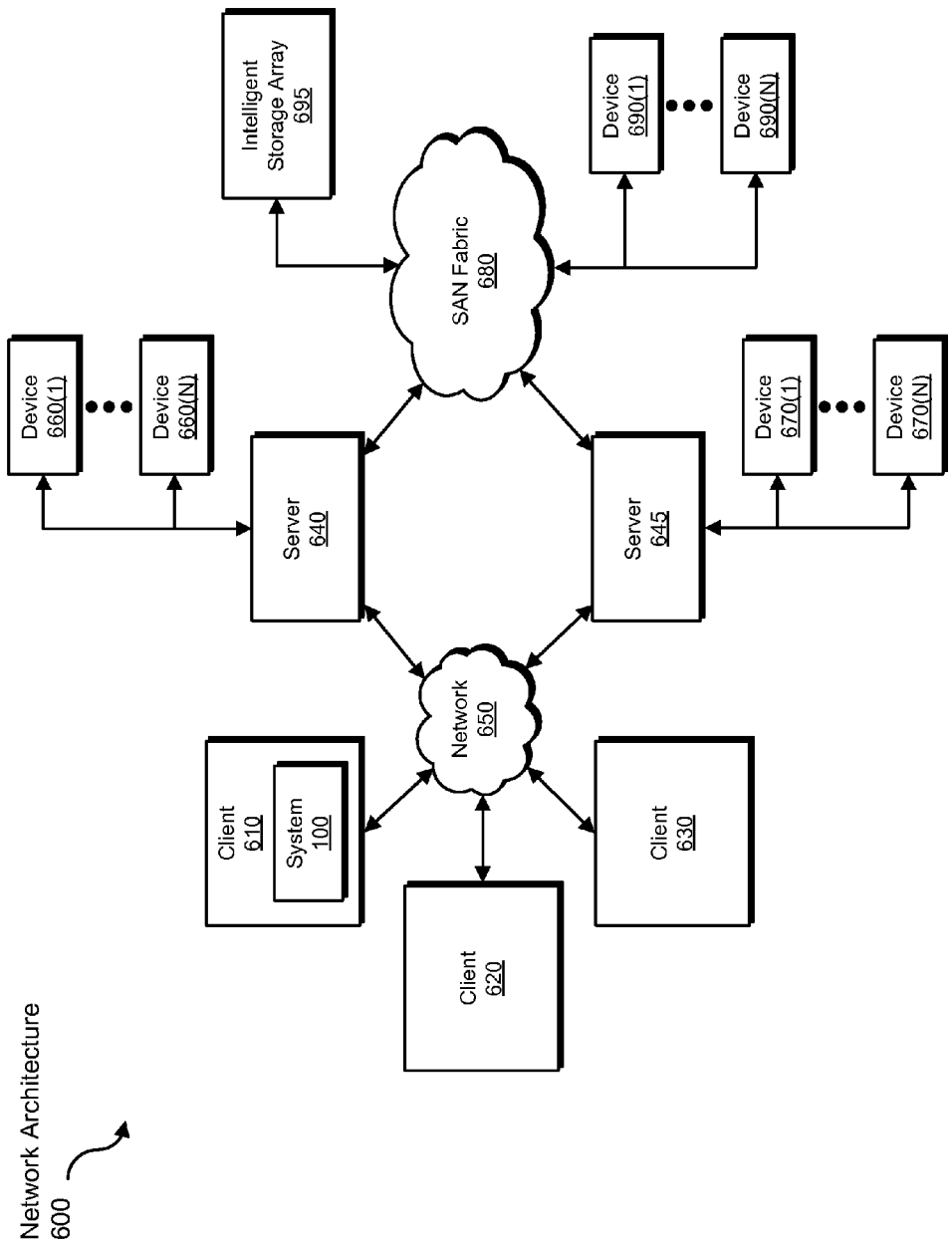
FIG. 6 is a block diagram of an exemplary computing network capable of implementing one or more of the embodiments described and/or illustrated herein.

(e.g., computing device 202 and/or client system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more containers of a deduplicating data system and/or one or more backup images that reference containers within the deduplicating data system.

Database 120 may represent portions of a single database or computing device or a plurality of databases or computing devices. For example, database 120 may represent a portion of client system 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as client system 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204. Computing device 202 may be programmed with one or more of modules 102 and/or may store all or a portion of the data in database 120. Additionally or alternatively, client system 206 may be programmed with one or more of modules 102 and/or may store all or a portion of the data in database 120.

In one embodiment, one or more of modules 102 from FIG. 1 may, when executed by at least one processor of computing device 202 and/or client system 206, facilitate computing device 202 and/or client system 206 in reclaiming storage space in deduplicating data systems. For example, and as will be described in greater detail below, computing device 202 may be configured to store one or more backup images from client system 206. In some examples, one or more of modules 102 may cause computing device 202 and/or client system 206 to reclaim storage space in a deduplicating data system 210. For example, and as will be described in greater detail below, storing module 104 may be programmed to store at least one non-synthesized backup image (e.g., a backup image 212) within deduplicating data system 210 by storing at least one data segment (e.g., a segment 224) of non-synthesized backup image 212 within a container 220 of deduplicated data segments 222 that is used by deduplicating data system 210. Synthesizing module 106 may be programmed to store at least one synthesized backup image (e.g., a backup image 216) within deduplicating data system 210 by referencing at least one previously stored data segment (e.g., a segment 226) within container 220 that is also referenced by a previous backup image (e.g., a backup image 214) within deduplicating data system 210. Determination module 108 may be programmed to determine that no non-synthesized backup images still reference container 220. Removing module 110 may be programmed to remove data segment 224 of non-synthesized backup image 212 from container 220 of deduplicated data segments 222 in response to determining that no non-synthesized backup images still reference container 220 and determining that no synthesized backup image references data segment 224.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing device 202 may represent a backup, storage, and/or deduplicating server, appliance, and/or system that deduplicates data, stores deduplicated data, backups up data, and/or manages deduplicated data.

Client system 206 generally represents any type or form of computing device that is capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. Examples of client system 206 include, without limitation, application servers and database servers configured to provide various database services and/or run certain software applications. In some examples, client system 206 may provide data to computing device 202 to back up, deduplicate, and/or store.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), a Storage Area Network (SAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and client system 206.

Figure 3:
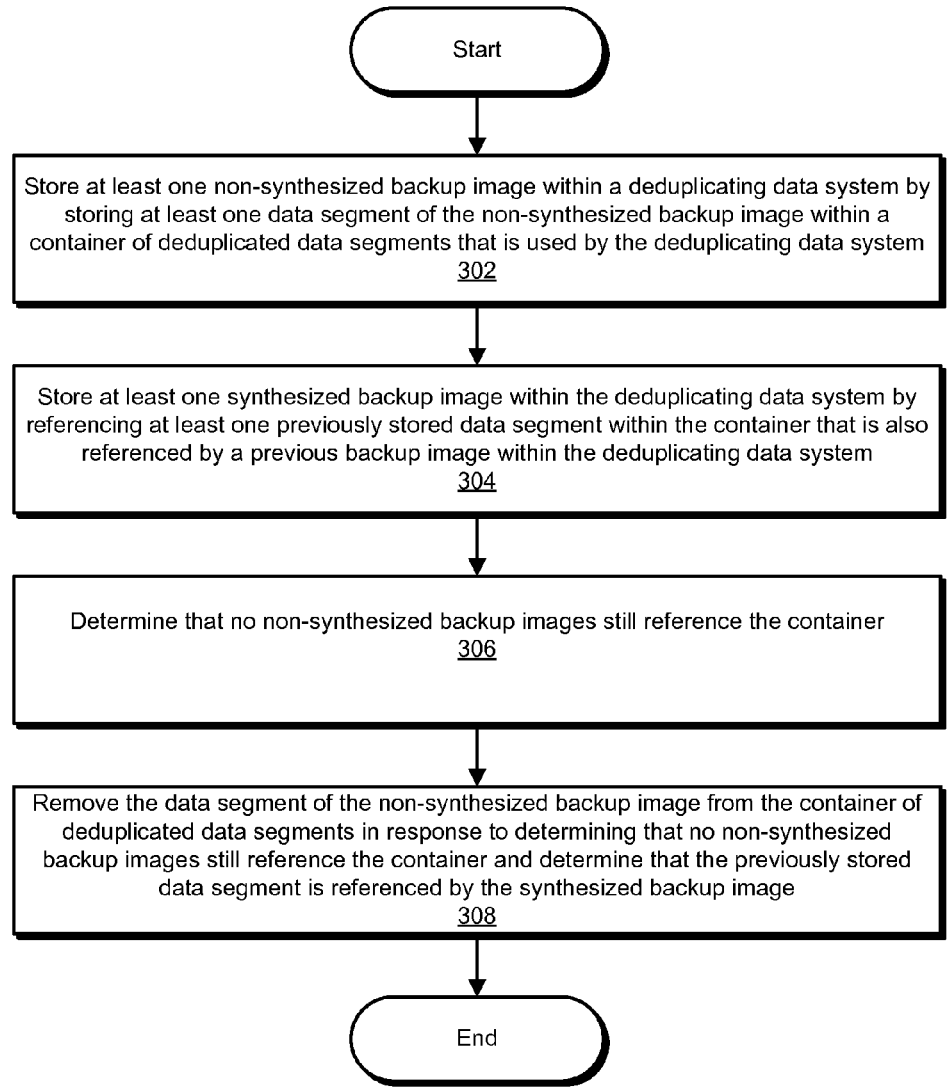
FIG. 3 is a flow diagram of an exemplary method for reclaiming storage space in deduplicating data systems.

FIG. 3 is a flow diagram of an exemplary computer-implemented method 300 for reclaiming storage space in deduplicating data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may store at least one non-synthesized backup image within a deduplicating data system by storing at least one data segment of the non-synthesized backup image within a container of deduplicated data segments that is used by the deduplicating data system. For example, at step 302 storing module 104 may, as part of computing device 202 in FIG. 2, store at least one non-synthesized backup image (e.g., backup image 212) within deduplicating data system 210 by storing at least one data segment (e.g., segment 224) of non-synthesized backup image 212 within container 220 of deduplicated data segments 222 that is used by deduplicating data system 210.

The phrase "backup image," as used herein, generally refers to any type or form of file that includes a complete or partial copy of the contents and/or data located on a computing or storage device at a particular point in time. Examples of such backup images include, without limitation, full backup images, incremental backup images, differential backup images, accelerator backup images, deduplicated backup images, synthetic (or "synthesized") backup images, snapshots, combinations of one or more of the same, or any other suitable backup images.

The phrase "non-synthesized backup image," as used herein, generally refers to any backup image derived from a backup target (e.g., instead of from a synthesis of existing backup images). Accordingly, in some examples, a backup system may store non-synthesized backup images within a deduplicating data system by submitting data segments of the non-synthesized backup images to the deduplicating data system. In some examples, the phrase "non-synthesized backup image" may also refer to a synthesized backup image that references a container within a deduplicating data system before the container expires.

As used herein, the phrase "deduplicating data system" generally refers to any type or form of storage device and/or mechanism capable of deduplicating data, storing deduplicated data, and/or managing deduplicated data. Examples of deduplicating data systems may include, without limitation, SYMANTEC's NETBACKUP PUREDISK, NETBACKUP SURESCALE, BACKUP EXEC, COMMVAULT's SIMPANA SOFTWARE, and/or EMC's DATA DOMAIN. In at least one example, the term "deduplicating data system" may refer to a single-instance storage system. In some examples, a deduplicating data system may store deduplicated data segments that are referenced by backup images.

As used herein, the term "container" may refer to any data structure, storage system, and/or location that stores, contains, includes, and/or points to a subset of data segments stored within a deduplicating data system. In some examples, containers may contain or tend to contain data segments from interrelated data objects. For example, if a deduplicating data system is used as part of a backup system, the deduplicating data system may store (or attempt to store, subject to other constraints) the data segments of a given backup image in the same container or set of containers.

In some cases, containers used to store deduplicated data segments may be kept in active use for new non-synthesized backups for finite periods of time. For example, the container may expire at a predetermined time, before which the container accepts new deduplicated data segments (and/or new references to deduplicated data segments) and after which the container no longer accepts new deduplicated data segments (and/or new references to deduplicated data segments).

In some examples, deduplicating data systems may use garbage collection procedures to reclaim storage space. To avoid complexity and improve performance (e.g., in the case of a highly-scalable deduplicating data system), deduplicating data systems may maintain information about references from backup images to containers. This may facilitate deallocating entire containers that are no longer referenced by any backup image. For example, a container may be assigned an expiration date, after which new deduplicated data segments may not be added to the container and/or after which new references to deduplicated data segments within the container may not be added. Accordingly, a deduplicating data system may delete a container if the container is not referenced and is expired. In this manner, if all backup images up to a given point in time are deleted, a container that was set to expire by that point in time may be freeable.

However, as will be explained in greater detail below, some containers may be perpetually referenced by synthesized backup images. Accordingly, as will be explained in greater detail below, the systems and methods described herein may distinguish between non-synthesized backups that reference containers and synthesized backups that reference containers.

Storing module 104 may store the non-synthesized backup image in any suitable manner. For example, storing module 104 may store the non-synthesized backup image by referencing deduplicated data segments corresponding to the non-synthesized backup image within the container (e.g., and adding any unique deduplicated data segments from the backup image to the container). In some examples, storing module 104 may also create an image map for the non-synthesized backup image that contains the container and segment location for each data segment referenced by the non-synthesized backup image.

In some examples, storing module 104 may store the non-synthesized backup within the deduplicating data system before the container no longer accepts new deduplicated data segments. For example, storing module 104 may reference the container to store the backup image in response to determining that the container still accepts new deduplicated data segments (e.g., because the container has not yet expired).

In one embodiment, storing module 104 may, as a part of storing the non-synthesized backup image, increment a non-synthesized reference count for the container. The non-synthesized reference count may indicate a number of non-synthesized backup images that reference the container. As will be explained in greater detail below, systems described herein may maintain the non-synthesized reference count to determine when the non-synthesized reference count reaches zero (e.g., after systems described herein decrement the non-synthesized reference count in response to removing non-synthesized backup images from the deduplicating data system). In some examples, the systems described herein may also increment the non-synthesized reference count when a non-synthesized backup image references the container before the container has expired.

Figure 4:
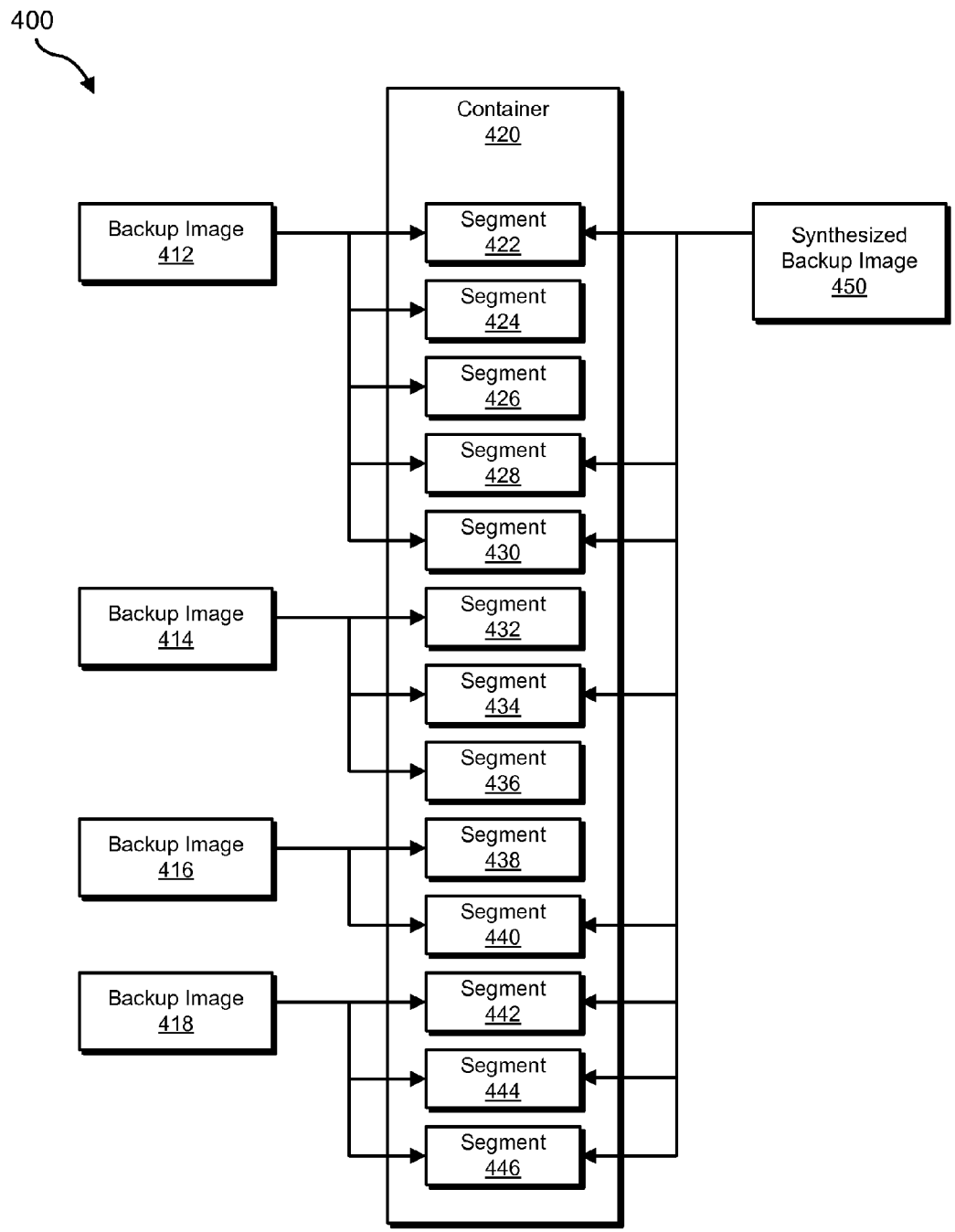
FIG. 4 is a block diagram of an exemplary deduplicating data system.

To provide an example of storing module 104 storing the non-synthesized backup image, FIG. 4 illustrates an exemplary deduplicating data system 400. As shown in FIG. 4, deduplicating data system 400 may include a container 420 for storing deduplicated data segments. Backup images 412, 414, 416, and 418 may reference segments 422, 424, 426, 428, 430, 432, 434, 436, 438, 440, 442, 444, and 446 within container 420. Using FIG. 4 as an example, at step 302 storing module 104 may store non-synthesized backup image 412 in deduplicating data system 400 by referencing segments 422, 424, 426, 428, and 430, which comprise backup image 412.

Returning to FIG. 3, at step 304 one or more of the systems described herein may store at least one synthesized backup image within the deduplicating data system by referencing at least one previously stored data segment within the container that is also referenced by a previous backup image within the deduplicating data system. For example, at step 304 synthesizing module 106 may, as part of computing device 202 in FIG. 2, store at least one synthesized backup image within the deduplicating data system by referencing at least one previously stored data segment within the container that is also referenced by a previous backup image within the deduplicating data system.

The phrase "synthesized backup image," as used herein, generally refers to a backup image that is derived from existing backup images. For example, a synthesized backup image may be derived from a full backup image in combination with a chain of incremental backup images. In some examples, a synthesized backup image stored within a deduplicating data system may reference existing deduplicated data segments that are already referenced by the backup images from which the synthesized backup image is synthesized. In some examples, the phrase "synthesized backup image" may refer to a forever incremental backup and/or an accelerator backup. The phrase "accelerator backup," as used herein, may refer to a backup that is synthesized from existing data (e.g., from one or more prior backups) stored by a backup server and tracked changed data (e.g., since a previous backup) that has been transmitted to a backup server.

In some examples, synthesizing module 106 may store the synthesized backup image within the deduplicating data system after the container no longer accepts new deduplicated data segments. For example, synthesizing module 106 may store the synthesized backup image by referencing existing deduplicated data segments within the container after the container has expired. As will be explained in greater detail below, because a container may be referenced indefinitely by a series of synthesized backup images due the synthesized backup images referencing a small proportion of data segments within the container (e.g., potentially requiring a 64 megabyte container to persist in order to store 24 kilobytes of data), the systems described herein may distinguish between non-synthesized and synthesized backup images during garbage collection.

In some examples, synthesizing module 106 may, as a part of storing the synthesized backup image within the deduplicating data system, store an indication of an initial location within the container of the previously stored data segment in a container map. For example, synthesizing module 106 may store an identifier of the previously stored data segment in association with the initial location of the data segment within the container map. As will be explained in greater detail below, in some examples systems described herein move the data segment to a different location within the container and store the new location of the data segment within the container map along with the original location of the data segment.

In one embodiment, synthesizing module 106 may, as a part of storing the synthesized backup image, increment a synthesized reference count for the container. The synthesized reference count may indicate a number of synthesized backup images that reference the container. As will be explained in greater detail below, systems described herein may maintain the synthesized reference count (e.g., separately from a non-synthesized reference count) to determine whether a container that has expired may be entirely deleted (e.g., because both the synthesized reference count and the non-synthesized reference count are at zero) or whether data segments corresponding to synthesized backup images are to be preserved (e.g., because the synthesized reference count is above zero and the non-synthesized reference count is at zero). In some examples, the systems described herein may increment the synthesized reference count only when a synthesized backup image references the container after the container has expired (e.g., does not accept new deduplicated data segments).

In some examples, synthesizing module 106 may also create an image map for the synthesized backup image that contains the container and segment location for each data segment referenced by the synthesized backup image. In some examples, synthesizing module 106 may maintain segment-level reference information indicating deduplicated data segments referenced by synthesized backup images. In this manner, systems described herein may periodically reclaim these data segments, once unreferenced, during garbage collection.

Using FIG. 4 as an example, at step 304 synthesizing module 106 may store a synthesized backup image 450 in deduplicating data system 400. For example, synthesizing module 106 may create references to segments 422, 428, 430, 434, 440, 442, 444, and 446 (e.g., which may comprise synthesized backup image 450) to store synthesized backup image 450.

Returning to FIG. 3, at step 306 one or more of the systems described herein may determine that no non-synthesized backup images still reference the container. For example, at step 306 determination module 108 may, as part of computing device 202 in FIG. 2, determine that no non-synthesized backup images still reference the container.

Determination module 108 may determine that no non-synthesized backup images still reference the container in any suitable manner. For example, as described earlier, in some examples systems described herein may maintain a non-synthesized reference count for the container (e.g., by incrementing the reference count when a non-synthesized backup image newly references the container and decrementing the reference count when a non-synthesized backup image is removed).

Using FIG. 4 as an example, backup images 412, 414, 416, and 418 may be removed from deduplicating data system 400. Accordingly, determination module 108 may determine that no non-synthesized backup images still reference the container.

Returning to FIG. 3, at step 308 one or more of the systems described herein may remove the data segment of the non-synthesized backup image from the container of deduplicated data segments in response to determining that no non-synthesized backup images still reference the container and determining that no synthesized backup image references the data segment. For example, at step 308 removing module 110 may, as part of computing device 202 in FIG. 2, remove the data segment of the non-synthesized backup image from the container of deduplicated data segments in response to determining that no non-synthesized backup images still reference the container and determining that no synthesized backup image references the data segment.

Removing module 110 may remove the data segment of the non-synthesized backup image from the container in any suitable manner. For example, removing module 110 may, upon determining that no non-synthesized backup images still reference the container but that one or more synthesized backup images still reference the container, delete the data segment from the container (e.g., along with any other data segments that are not referenced by a synthesized backup image). In one example, removing module 110 may delete the data segment based on the data segment not appearing within a container map for the container.

In one example, in order to isolate data segments that are still referenced by synthesized backup images, removing module 110 may rename the container file to a temporary name, create a new container file with the original container name, copy only the referenced data segments (e.g., referenced by the synthesized backup images) to the new container file, and then delete the original container file with the temporary name. In this example, removing module 110 may update the container map with the new location of the data segment within the container (e.g., such that the container map stores an identifier of the data segment in association with the original location of the data segment within the container and the current location of the data segment within the container).

Accordingly, in some examples, removing module 110 may, as a part of removing the data segment of the non-synthesized backup from the container, compact the container by moving the previously stored data segment to a new location within the container. In these examples, removing module 110 may store an indication of the new location within the container of the previously stored data segment in the container map.

In some examples, systems described herein may include restoring the synthesized backup image by retrieving a current location within the container of the previously stored data segment from a container map that corresponds to the container. In those examples where, as described above, removing module 110 updated the container map with the new location of the previously stored data segment, during restoration the systems described herein may check to see if the previously stored data segment is in a container map and then identify the new location of the previously stored data segment. In this manner, the systems described herein may not need to separately update each backup image with the new location of the previously stored data segment. In some examples, the non-synthesized reference count may be above zero during a restore request. In these examples, the systems described herein may omit checking the container map for a new data segment location.

Using FIG. 4 as an example, at step 308 removing module 110 may remove segments 424, 426, 432, 436, and 438 from container 420. In some examples, removing module 110 may also compact container 420 and update a container map with the new locations of the remaining data segments.

In one example, a deduplicating data system may maintain two reference counts for each container. An active image reference count may refer to the number of active (but not accelerator) backup images that reference the container. An accelerator reference count may represent the number of accelerator backup images that reference the container. The active image reference count may comprise one embodiment of the non-synthesized reference count described earlier and the accelerator reference count may comprise one embodiment of the synthesized reference count described earlier. The container may be referenced by any new accelerator backup image if the container is being referenced by any non-accelerator backup image or any accelerator backup image. The deduplicating data system may also maintain a map for the container with the location of each accelerator-image-referenced segment. This system may update the map with the new location of segments at the time of container compaction. The container map may include a segment identifier, an original location of the data segment, and a new location of the data segment.

In the case of a normal (i.e., non-accelerator) backup, the system may increase the active image reference count of the container when any segment of the container is referenced. In the case of an accelerator backup, if the container is still active (i.e., has not expired and/or aged-out), the accelerator backup may be treated like a normal backup. If the container has aged-out and a reference request comes from an accelerator backup, the system may increment the accelerator reference count and keep the segment location information in the container map.

During post-processing, a garbage collector may delete the entire container if both the active image reference count and the accelerator reference count are zero. If the accelerator reference count is non-zero and the active image reference count is zero then during post-processing the system may reclaim unused storage. If the accelerator reference count is non-zero and the active image reference count is zero then the system may delete all segments other than those mentioned in the container map file (keeping only those segments that are referenced by accelerator backup images). After deleting old segments, the system may update the container map file with the new segment location. The container map file may then have a mapping of the segment identifier, the old location of the data segment, and the new location of the data segment.

When deleting old data segments, the system may 1) rename the container file to a temporary file name, 2) create a new container file with the original name of the container file, 3) copy only the referenced data segments from the container file to the new container file, 4) delete the container file with the temporary file name, and 5) update the container map file with the new segment location (thereby storing the segment identifier, the old location of the data segment, and the new location of the data segment).

In this manner, the system may not need to update the (potentially hundreds of) backup image map files. When a request comes at restore time, a plugin may check if the segment is in a map file and then find out the new location of the segment and return the segment content. For a restore request, if the active image reference count is more than zero, the plugin may skip checking the new segment location in the map file. The plugin may only consider the map file if the active image reference count is zero. In the case that there is no entry for a new location of the data segment, the system may determine that storage compaction has not occurred and the plugin may read the data segment from the original location.

If an accelerator image is expired, the system may decrement the accelerator reference count. The system may delete the container if the accelerator reference count becomes zero.

For further optimization in reclaiming storage, in the case of accelerator backup images, the system may maintain references in the map file on a per-segment basis (e.g., using segment-based referencing for only those segments referenced by accelerator backup images). By leveraging this information, the system may reclaim storage by periodic garbage collection.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for reclaiming storage space in deduplicating data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive backup images to be transformed, transform the backup images into deduplicated data and information about efficiently storing and managing the deduplicated data, output a result of the transformation to a deduplicating data system, use the result of the transformation to reclaim storage for the deduplicating data system, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reclaiming storage space in deduplicating data systems, at least a portion of the method being performed by a computing device comprising at least one processor, the method comprising:
    storing at least one non-synthesized backup image within a deduplicating data system by storing at least one data segment of the non-synthesized backup image within a container of deduplicated data segments that is used by the deduplicating data system, wherein storing the non-synthesized backup image within the deduplicating data system comprises storing the non-synthesized backup within the deduplicating data system before the container no longer accepts new deduplicated data segments;
    storing at least one synthesized backup image within the deduplicating data system by referencing at least one previously stored data segment within the container that is also referenced by a previous backup image within the deduplicating data system, wherein the synthesized backup image was derived from a plurality of existing backup images comprising the previous backup image, wherein storing the synthesized backup image within the deduplicating data system comprises storing the synthesized backup image within the deduplicating data system after the container no longer accepts new deduplicated data segments: determining that no non-synthesized backup images still reference the container; removing the data segment of the non-synthesized backup image from the container of deduplicated data segments in response to determining that no non-synthesized backup images still reference the container and determining that no synthesized backup image references the data segment.

2. The computer-implemented method of claim 1, wherein storing the synthesized backup image within the deduplicating data system comprises storing an indication of an initial location within the container of the previously stored data segment in a container map.

3. The computer-implemented method of claim 2, wherein removing the data segment of the non-synthesized backup image from the container comprises:
    compacting the container by moving the previously stored data segment to a new location within the container;
    storing an indication of the new location within the container of the previously stored data segment in the container map.

4. The computer-implemented method of claim 1, wherein:
    storing the non-synthesized backup image comprises incrementing a non-synthesized reference count for the container;
    storing the synthesized backup image comprises incrementing a synthesized reference count for the container;
    determining that no non-synthesized backup images still reference the container comprises determining that the non-synthesized reference count for the container is at zero.

5. The computer-implemented method of claim 1, wherein the container expires at a predetermined time, before which the container accepts new deduplicated data segments and after which the container no longer accepts new deduplicated data segments.

6. The computer-implemented method of claim 1, further comprising restoring the synthesized backup image by retrieving a current location within the container of the previously stored data segment from a container map that corresponds to the container.

7. A system for reclaiming storage space in deduplicating data systems, the system comprising:
    a storing module that stores at least one non-synthesized backup image within a deduplicating data system by storing at least one data segment of the non-synthesized backup image within a container of deduplicated data segments that is used by the deduplicating data system, wherein storing the non-synthesized backup image within the deduplicating data system comprises storing the non-synthesized backup within the deduplicating data system before the container no longer accepts new deduplicated data segments;
    a synthesizing module that stores at least one synthesized backup image within the deduplicating data system by referencing at least one previously stored data segment within the container that is also referenced by a previous backup image within the deduplicating data system, wherein the synthesized backup image was derived from a plurality of existing backup images comprising the previous backup image, wherein storing the synthesized backup image within the deduplicating data system comprises storing the synthesized backup image within the deduplicating data system after the container no longer accepts new deduplicated data segments;
    a determination module that determines that no non-synthesized backup images still reference the container;
    a removing module that removes the data segment of the non-synthesized backup image from the container of deduplicated data segments in response to determining that no non-synthesized backup images still reference the container and determining that no synthesized backup image references the data segment;
    at least one processor configured to execute the storing module, the synthesizing module, the determination module, and the removing module.

8. The system of claim 7, wherein the synthesizing module stores the synthesized backup image within the deduplicating data system by storing an indication of an initial location within the container of the previously stored data segment in a container map.

9. The system of claim 8, wherein the removing module removes the data segment of the non-synthesized backup from the container by:
compacting the container by moving the previously stored data segment to a new location within the container;
storing an indication of the new location within the container of the previously stored data segment in the container map.

10. The system of claim 7, wherein:
the storing module stores the non-synthesized backup image by incrementing a non-synthesized reference count for the container;
the synthesizing module stores the synthesized backup image by incrementing a synthesized reference count for the container;
the determination module determines that no non-synthesized backup images still reference the container by determining that the non-synthesized reference count for the container is at zero.

11. The system of claim 7, wherein the container expires at a predetermined time, before which the container accepts new deduplicated data segments and after which the container no longer accepts new deduplicated data segments.

12. The system of claim 7, further comprising a restoring module that restores the synthesized backup image by retrieving a current location within the container of the previously stored data segment from a container map that corresponds to the container.

13. A non-transitory computer-readable-storage medium comprising one or more computer-readable instructions that, when executed by at least one processor of a computing device, cause the computing device to:
store at least one non-synthesized backup image within a deduplicating data system by storing at least one data segment of the non-synthesized backup image within a container of deduplicated data segments that is used by the deduplicating data system, wherein storing the non-synthesized backup image within the deduplicating data system comprises storing the non-synthesized backup within the deduplicating data system before the container no longer accepts new deduplicated data segments;
store at least one synthesized backup image within the deduplicating data system by referencing at least one previously stored data segment within the container that is also referenced by a previous backup image within the deduplicating data system, wherein the synthesized backup image was derived from a plurality of existing backup images comprising the previous backup image, wherein storing the synthesized backup image within the deduplicating data system comprises storing the synthesized backup image within the deduplicating data system after the container no longer accepts new deduplicated data segments;
determine that no non-synthesized backup images still reference the container;
remove the data segment of the non-synthesized backup image from the container of deduplicated data segments in response to determining that no non-synthesized backup images still reference the container and determining that no synthesized backup image references the data segment.

14. The non-transitory computer-readable-storage medium of claim 13, wherein the one or more computer-readable instructions cause the computing device to store the synthesized backup image within the deduplicating data system by storing an indication of an initial location within the container of the previously stored data segment in a container map.

15. The computer-implemented method of claim 1, wherein:
the container is configured to expire at a predetermined time;
the container accepts new deduplicated data segments before the container expires but does not accept new deduplicated data segments after the container expires.

* * * * *